(12) United States Patent
Eves et al.

(10) Patent No.: US 7,740,531 B2
(45) Date of Patent: Jun. 22, 2010

(54) OPERATION OF A SET OF DEVICES

(75) Inventors: David A. Eves, Crawley (GB); Richard S. Cole, Redhill (GB)

(73) Assignee: amBX UK Limited, Surrey (GB)

( * ) Notice: Subject to any disclaimer, the term of this patent is extended or adjusted under 35 U.S.C. 154(b) by 2078 days.

(21) Appl. No.: 10/143,642

(22) Filed: May 10, 2002

(65) Prior Publication Data

US 2002/0169012 A1      Nov. 14, 2002

(30) Foreign Application Priority Data

May 11, 2001  (GB)  .................................. 0111431.3
Nov. 29, 2001  (GB)  .................................. 0128524.6

(51) Int. Cl.
*A63F 9/24*  (2006.01)
*A63F 13/00*  (2006.01)
*G06F 17/00*  (2006.01)
*G06F 19/00*  (2006.01)

(52) U.S. Cl. .............................. 463/1; 434/322; 463/8; 463/40; 463/43

(58) Field of Classification Search .................... 463/1, 463/30–35, 40, 42
See application file for complete search history.

(56) References Cited

U.S. PATENT DOCUMENTS

| | | | | |
|---|---|---|---|---|
| 5,695,400 A | * | 12/1997 | Fennell et al. | ................ 463/42 |
| 5,795,228 A | * | 8/1998 | Trumbull et al. | .............. 463/42 |
| 5,855,483 A | * | 1/1999 | Collins et al. | ............... 434/322 |
| 5,887,118 A | | 3/1999 | Huffman et al. | ............ 392/390 |
| 5,956,038 A | * | 9/1999 | Rekimoto | .................... 345/419 |
| 5,964,660 A | * | 10/1999 | James et al. | ................... 463/1 |
| 6,007,338 A | * | 12/1999 | DiNunzio et al. | ............. 434/55 |
| 6,050,822 A | | 4/2000 | Faughn | ......................... 434/11 |
| 6,056,640 A | | 5/2000 | Schaaij | .......................... 463/4 |
| 6,159,100 A | * | 12/2000 | Smith | .......................... 463/42 |
| 6,243,707 B1 | * | 6/2001 | Humpleman et al. | ........ 707/102 |
| 6,354,940 B1 | * | 3/2002 | Itou et al. | ...................... 463/8 |
| 6,379,253 B1 | * | 4/2002 | Nishioka | ....................... 463/43 |
| 7,118,482 B2 | * | 10/2006 | Ishihara et al. | ................. 463/43 |
| 7,147,561 B2 | * | 12/2006 | Takeuchi | ..................... 463/40 |

FOREIGN PATENT DOCUMENTS

EP            0508939 A2    3/1992
WO         WO9859282       6/1998

* cited by examiner

*Primary Examiner*—John M. Hotaling, II
*Assistant Examiner*—Paul A. D'Agostino
(74) *Attorney, Agent, or Firm*—Burns & Levinson LLP; Bruce D. Jobse

(57) ABSTRACT

A method of operating a set of devices comprises receiving a signal, for example at least part of a game world model from a computer program. The signal is analyzed to produce a real-world description in the form of an instruction set of a markup language and the set of devices is operated according to the description.

18 Claims, 3 Drawing Sheets

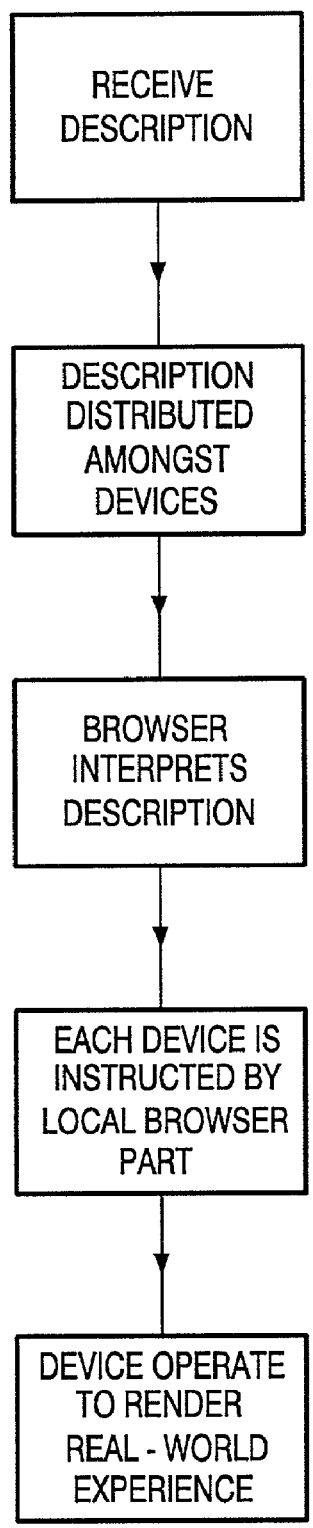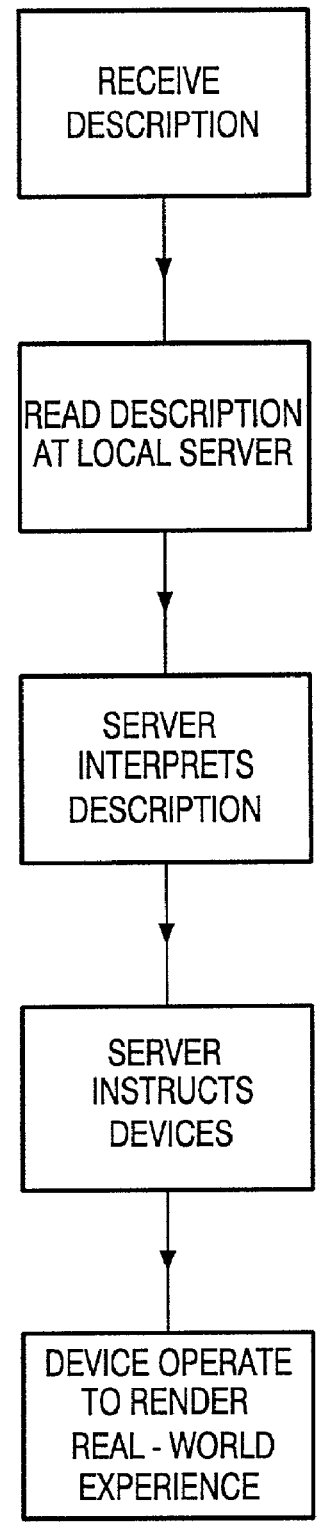
FIG. 3
FIG. 4

OPERATION OF A SET OF DEVICES

This invention relates to a method of and apparatus for operating a set of devices. In particular this invention relates to receiving a signal produced by a computer program, the signal comprising a game world model, analysing the signal to produce a real-world description in the form of an instruction set of a markup-language, and operating the devices according to the description.

When playing a computer game, the user's experience of the game consists, in most cases, of the viewing of a simple display device while listening to the associated audio. Since the advent of computer games, it has been desired to augment this user experience. A number of ways of achieving this have been proposed, including head mounted displays, surround screen installations and game peripherals such as rumble pads. The object of these functional improvements has been to increase the user's immersion in the game environment, or game world model. However a number of problems are apparent with the known improvements, including the high cost of any extra devices, the fact that most solutions are proprietary and therefore not transferable between platforms, and that generally each solution adds only a small additional functionality to the game world.

According to a first aspect of the invention, there is provided a method of operating a set of devices, comprising receiving a signal, analysing said signal to produce a real-world description in the form of an instruction set of a markup language, and operating said devices according to said description.

According to a second aspect of the invention, there is provided apparatus for operating a set of devices, comprising receiving means for receiving a signal and analysing means for analysing said signal to produce a real-world description in the form of an instruction set of a markup language.

The signal may be a broadcast signal or may be a signal produced by a computer program. The signal may comprise at least part of a game world model. The signal may comprise a video component. Preferably the description is distributed amongst said devices. The analysing can take place in real time, or can be carried out before it is needed, storing the real-world description locally and recalling that description on demand. The real-world description is preferably limited according to the functionality of the devices present in the set of devices.

Owing to the invention, it is possible to provide an enhanced experience of, for example, a computer game. By analysing the content of the signal making up the game and producing from it a real-world description in the form of an instruction set of a markup language, the description can be used to operate a set of devices that will augment the experience.

Embodiments of the invention will now be described, by way of example only, with reference to the accompanying drawings, in which:

FIG. 3 is a flowchart of a method of controlling a set of devices, and

FIG. 4 is a flowchart of an alternative method of controlling a set of devices.

Figure 1:
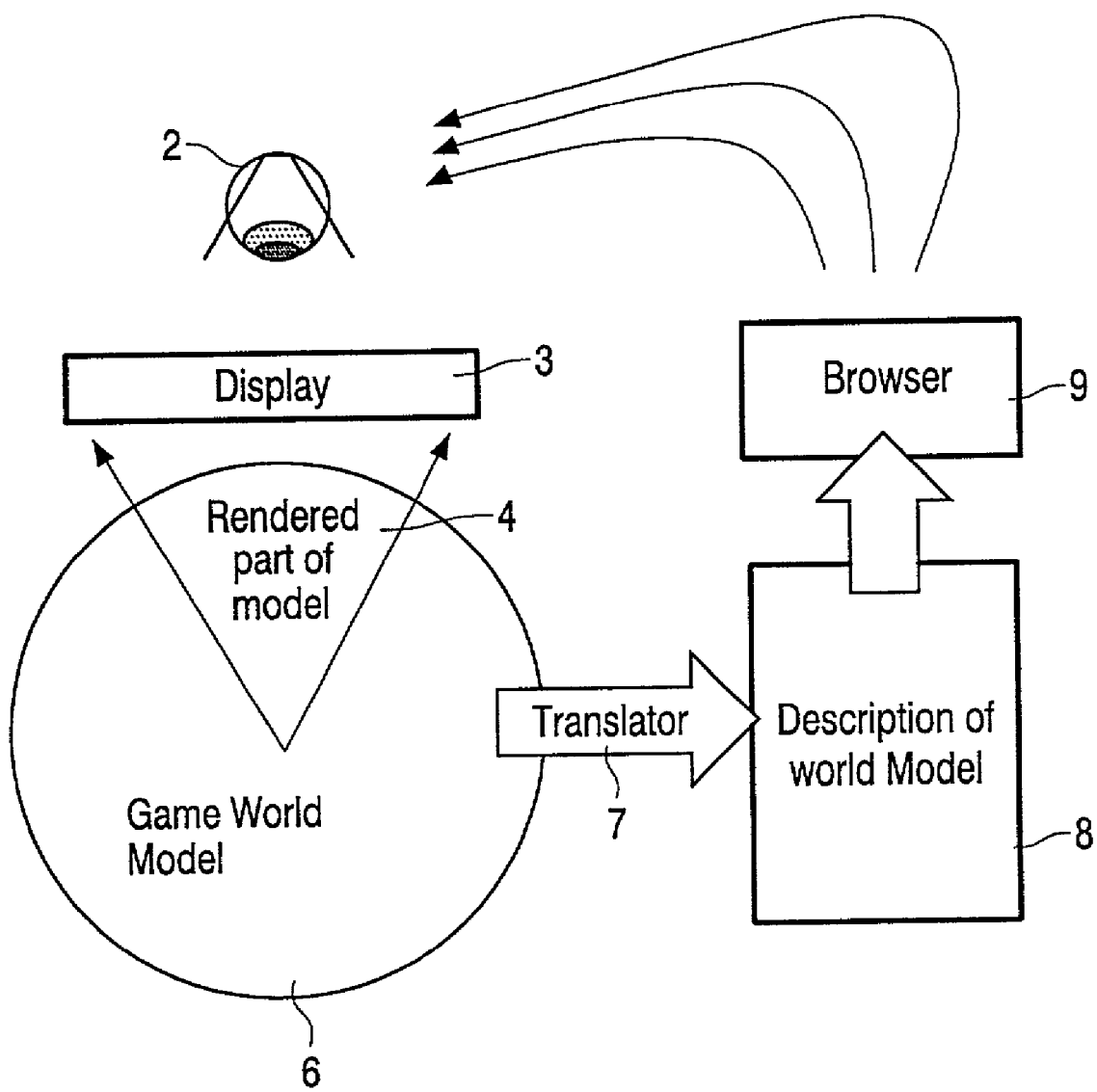
FIG. 1 is a schematic view of a method of operating a set of devices.

The method of FIG. 1 illustrates how a user 2 of a computer game has their experience of the game augmented by the generation of a real-world description in the form of an instruction set of a markup language. This instruction set is used to operate a set of devices that make up a real-world representation system. The markup language is used, in general, to describe the real world elements associated with the virtual world of the computer game that fall outside the part of the visual field available to the user.

The user 2 views a display 3 of a PC that displays a video component of the computer game. The display 3 can be thought of as showing a rendered part 4 of a game world model 6. The part 4 is typically the portion of the game world model 6 that relates to the particular location that the user is currently experiencing. As the user 2 "moves" around the game world, the part that is rendered changes accordingly.

A translator 7 receives a signal produced by a computer program, which comprises at least part of the game world model 6, and analyses the signal to produce a real-world description 8 in the form of an instruction set of a markup language. In this example, the analysing takes place in real time, the signal that the translator 7 receives being the entire model 6. The translator 7 analyses the signal to identify the environment that is presently being rendered on the display 3, and generates an appropriate real-world description, which is passed to a browser 9. The real-world description can be updated rapidly, as the game progresses. The browser 9 is either present on a local server, or is distributed amongst the set of devices.

The translator 7 could be a plug in unit for the apparatus running the computer program. The unit would comprise receiving means for receiving the signal and analysing means for analysing the signal to produce the real-world description. Additionally distributing means could be included for distributing the description to the devices in the set. Alternatively the translator 7 could be implemented in software.

The real-world description is provided by a markup language that communicates a description of physical environments and the objects within them, their relationship to the user, each other and to the physical space. Within a location that is enabled to produce a real-world experience, the instruction set of the markup language is interpreted by a device or devices to render the experience. Each device that is enabled contains a component that interprets the instruction set to the best of its capability.

The language contains a wide range of states that can be rendered by the devices in a real-world representation system. Such states relate to:

Image display—specific images, streamed video
Audio—music, sound effects, voice
Mood—emotional, ambient, animated
Light—levels (relative/absolute), moods, colours, position, focus
Location—absolute, fantasy, generic type.

Any information that relates to the game world experience can be expressed in this markup language. The browser 9 is arranged to interpret the description, which is then rendered by the devices in a real-world representation system.

Figure 2:
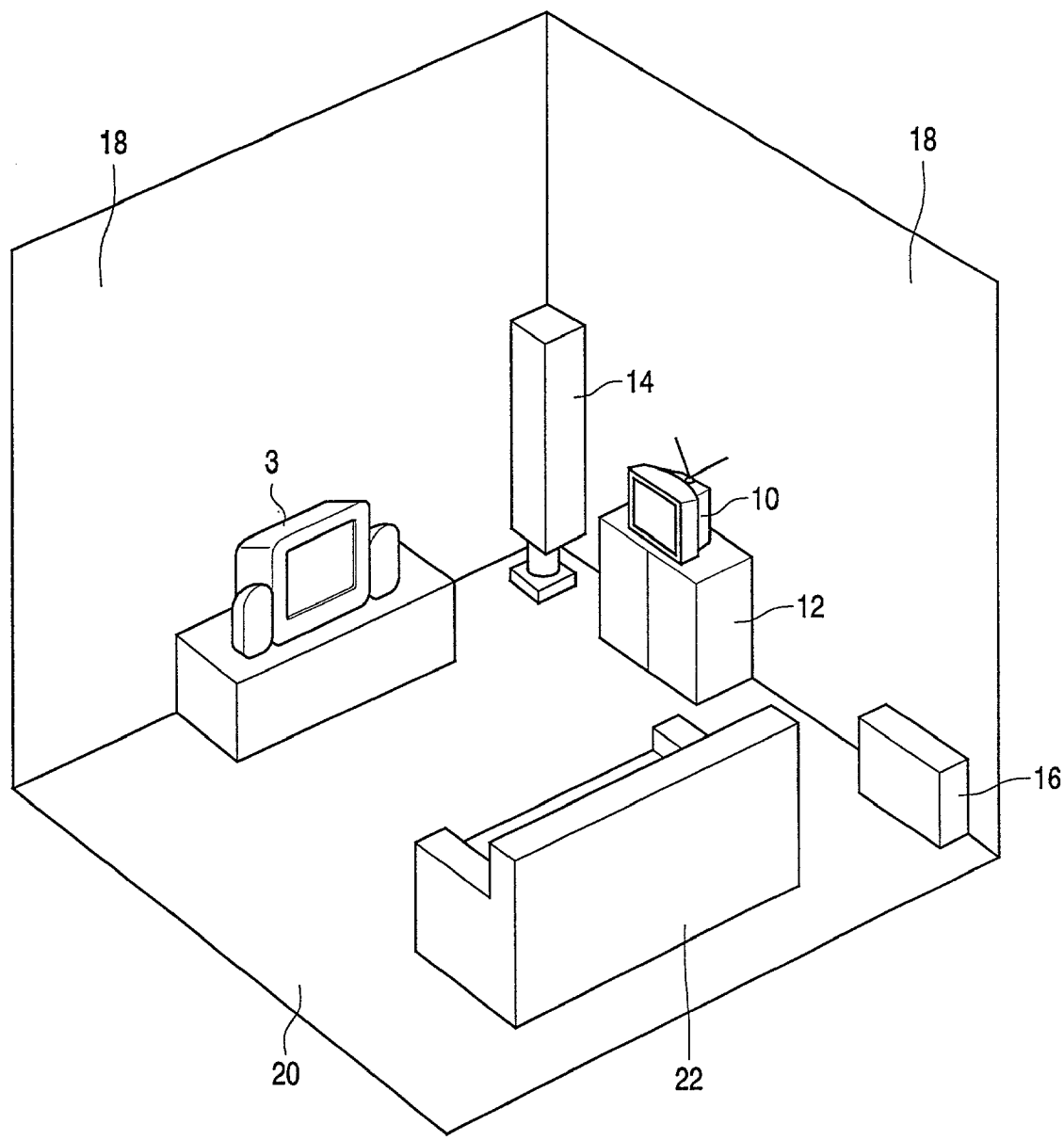
FIG. 2 is a perspective view of a real-world representation system.

FIG. 2 shows a real-world representation system comprising a set of devices including a display device 10, audio speakers 12, a lighting device 14, a heating device 16, walls 18 and the floor 20. These devices together contribute to make up the ambient environment, each device being arranged to provide one or more real-world parameters. For example, the lighting device 14 contributes colour tones as well as to the luminance level. The devices may be electronic or they may be purely mechanical. The devices are interconnected by either a wireless network or a wired network such as a powerline carrier network.

In addition to the display device 10, the walls 18 and floor 20 are provided with display functionality. This can be achieved either by the walls 18 and floor 20 being composed of fabric display material, or a centred ceiling projector can illuminate the visible portions of the walls 18 and the floor 20. It is also feasible to back light the walls 18 if the environment allows it.

The system of FIG. 2 is shown as being a room with a couch 22 for a user, the room being part of a private dwelling. However the room could be, for example, part of an entertainment complex or could form part of a public space. The devices making up the real-world representation system are arranged to receive a real-world description in the form of an instruction set of a markup language, the devices being operated according to said description.

In a first embodiment (outlined in the flowchart of FIG. 3) this description is distributed amongst the devices. Each markup language enabled device operates in principally the same manner. For example, the lighting device 14 has receiving means for receiving the real-world description in the form of an instruction set of a markup language, the receiving means including part of the distributed browser 9 that interprets the instructions of the instruction set. The portion of the browser 9 in the receiving means communicates with adjusting means that is arranged to adjust one or more parameters of the lighting device 14. For example, if the real-world description reads <FOREST>, <SUMMER>, <EVENING> then the part of the browser 9 in the receiving means interprets this into specific instructions relating to the colour tones and luminance level for the adjusting means to adjust their levels accordingly. In this example the likely colour tone would be a pleasant green and the light level would be low but warm. The browser 9 interprets instructions of a general type to generate specific parameter adjustments.

The description is received by all of the other parts of the distributed browser 9 in each of the other devices in the real-world representation system. Each device interprets the instructions and adjusts its parameter configuration accordingly. The greater number of enabled devices that are present in a particular environment the more realistic the end result will be. In particular the operability of the walls 18 and floor 20 as display devices will determine how immersed in the real-world representation the user feels.

In a second embodiment (outlined in the flowchart of FIG. 4) the description is read at a local server, which can be a dedicated device or could be contained within the capability of a device that nominally has a different purpose. In this embodiment a browser 9 or operating system is present on the local server and interprets the instructions of the real-world description and generates specific parameter adjustments for communicating to the relevant device. In this way devices currently available can be used without the requirement that they be modified or purpose built for use in the real-world representation system.

By using the game world model 6 to generate a markup language representation of the user's location, it is possible to extend the experience of the virtual location into the real world. This could also include audio, for example, a user could hear a monster creep up behind them. If a rocket just missed a user and hit the wall behind them, the lights at this location will glow yellow and red, and synchronise with the audio stream.

An alternative way of operating the set of devices is to generate the real-world description before it is needed, storing the real-world description locally and recalling the description on demand.

The real-world description, whether generated in real-time or before it is needed can be limited according to the functionality of the devices present in the set of devices. This saves on processing time and resources.

The computer game that the user is playing need not have a video component. For example, the user may be playing an electronic board game and the translator 7 will use the game world model 6 associated with the board game to generate a description in markup language. This description is rendered by the browser 9 to augment the user's experience of the electronic board game.

The method of operating a set of devices can also be utilised when the signal received by the translator 7 comprises a broadcast signal. The creation of the description from a broadcast signal allows the user to be immersed in an environment that is linked to a broadcast that he is receiving, for example a broadcast television signal. For example, the user may be watching a computer generated animation, that includes in the broadcast stream a signal comprising the model of the content. This signal can be analysed by the translator 7 to produce a real-world description that is used to operate the devices making up the real-world representation system.

The user can operate a user interface to set limits on the operation of the devices in the system. For example, if the user wishes to set the volume of those devices with an audio capability to a specific range or set an upper limit on the volume then they can do so via the user interface. This prevents experiences becoming unpleasant for the user. The level of the light and the rate of any change in light intensity are also things that the user can control. All of the parameters of the system can be user defined. The user interface can be portable.

The invention claimed is:

1. A method of operating a set of real-world devices that form a real-world ambient environment for a user, comprising:
    receiving a signal,
    analysing said signal to produce a real-world description in the form of an instruction set of a markup language,
    operating said real-world devices to control the real-world ambient environment according to said real-world description, and
    providing a user interface that allows the user to set limits on the real-world devices that are controlled by the real-world description including setting a maximum level of light provided from a real-world lighting device and a maximum rate of change in light intensity.

2. A method according to claim 1, wherein said signal comprises a broadcast signal.

3. A method according to claim 1, wherein said signal is produced by a computer program.

4. A method according to claim 3, wherein said signal comprises at least part of a game world model.

5. A method according to claim 1, wherein said signal comprises a video component.

6. A method according to claim 1, and further comprising distributing said real-world description amongst said devices.

7. A method according to claim 1, wherein said analysing takes place in real time.

8. A method according to claim 1, and further comprising storing said real-world description locally and recalling said description on demand.

9. A method according to claim 1, wherein said real-world description is limited according to functionality of the real-world devices present in the set of real-world devices.

10. Apparatus for operating a set of real-world devices that form a real-world ambient environment for a user, comprising:

receiving means for receiving a signal; and analysing means for analysing said signal to produce a real-world description in the form of an instruction set of a markup language;

controlling means to control the real-world ambient environment by controlling said real-world devices with said real-world description; and a user interface that allows the user to set limits on the real-world devices that are controlled by the real-world description, including setting a maximum level of light provided from a real-world lighting device and a maximum rate of change in light intensity.

11. Apparatus according to claim 10, and further comprising distributing means for distributing said real-world description amongst said devices.

12. Apparatus according to claim 10, and further comprising a user interface.

13. Apparatus according to claim 12, wherein said user interface is portable.

14. Apparatus according to claim 10 wherein the analysing means further comprises a translator that generates the real-world description that is passed to a browser.

15. Apparatus according to claim 14 wherein the browser is operatively coupled to the set of real-world devices and communicated to the set of real-world devices via the markup language.

16. Apparatus of claim 10 wherein the set of real-world devices include at least one of the following: a wall or a floor that is used to control the ambient environment.

17. A method according to claim 1, wherein analysing further comprises a translating the signal and passing the real-world description to a browser which is operatively coupled to the set of real-world devices to communicate with the set of real-world devices via the markup language and allow the user to become immersed in the real-world ambient environment.

18. A method according to claim 1, wherein the set of real-world devices include at least one of the following: a wall or a floor that is used to control the real-world ambient environment.

* * * * *